United States Patent [19]
Takato

[11] Patent Number: 5,815,312
[45] Date of Patent: Sep. 29, 1998

[54] REAL IMAGE TYPE FINDER

[75] Inventor: Hideyasu Takato, Hino, Japan

[73] Assignee: Azusa Patent Office, Tokyo, Japan

[21] Appl. No.: 614,719

[22] Filed: Mar. 13, 1996

[30] Foreign Application Priority Data

Mar. 14, 1995 [JP] Japan .................................... 7-054446

[51] Int. Cl.⁶ ............................ G02B 23/00; G02B 13/06
[52] U.S. Cl. .......................... 359/431; 359/422; 359/432
[58] Field of Search .......................... 359/362, 420–422, 359/431–433, 676–678, 683–684, 686, 708; 396/373–386

[56] References Cited

U.S. PATENT DOCUMENTS

| | | | |
|---|---|---|---|
| 5,005,955 | 4/1991 | Ohshita | 359/676 |
| 5,173,806 | 12/1992 | Ogata | 359/686 |
| 5,231,534 | 7/1993 | Kato | 359/432 |
| 5,359,377 | 10/1994 | Kamo | 359/432 |
| 5,448,411 | 9/1995 | Morooka | 359/432 |
| 5,701,199 | 12/1997 | Takato | 359/422 |

FOREIGN PATENT DOCUMENTS

| | | | |
|---|---|---|---|
| 611976 | 8/1994 | European Pat. Off. | 359/432 |
| 3-4217 | 1/1991 | Japan . | |
| 168408 | 6/1992 | Japan | 359/432 |
| 4-179908 | 6/1992 | Japan . | |
| 6-118303 | 4/1994 | Japan . | |

*Primary Examiner*—Thong Nguyen
*Attorney, Agent, or Firm*—Cushman Darby & Cushman IP Group of Pillsbury Madison & Sutro LLP

[57] ABSTRACT

The present invention provides a real image type of zoom finder which, albeit having a zoom ratio as high as at least 3, is short in terms of the total length of an objective, is well corrected in terms of aberrations and ensures good viewing, and which comprises, in order from the object side, an objective having a positive refracting power, an optical system for inverting the upper, lower, left and right parts of an image formed by said objective, and an eyepiece having a positive refracting power, wherein the objective consists essentially of a first lens group $G_1$ having a negative refracting power, a second lens group $G_2$ having a positive refracting power, a third lens group $G_3$ having a negative refracting power and a fourth lens group $G_4$ having a positive refracting power, each consisting of one lens or the second lens group $G_2$ consisting of two lenses, and conforms to the following conditional inequality (1):

$$1.35 < |f_1/f_2| \times m_T < 2.4 \tag{1}$$

where:

$f_1$ is the focal length of the first lens group, $f_2$ is the focal length of the second lens group, and $m_T$ is the magnification of the finder at the telephoto end.

21 Claims, 8 Drawing Sheets

REAL IMAGE TYPE FINDER

BACKGROUND OF THE INVENTION

The present invention relates to a real image type of zoom finder suitable for use on lens shutter cameras or still video cameras.

In general, a virtual image type finder is widely used on cameras such as lens shutter cameras wherein a finder optical system is provided apart from a photographic optical system. However, one problem with the virtual image type finder is that the diameter of the front lens increases with an increase in zoom ratio. Another problem is that the viewing frame cannot be seen clearly. A real image type finder, on the other hand, enables the diameter of the front lens to be decreased because the entrance pupil can be located forward. Moreover, since an image formed by an objective is observed through an eyepiece, the problems associated with the above-mentioned virtual image type finder are almost nearly resolved, so that a finder with the viewing frame being well seen is achievable.

Such a real image type of finder optical system is mounted on most of currently available lens shutter cameras that have a zooming function. In recent years, increased zoom ratios have been adopted as well.

So far, two-group or three-group zoom types of finders have been put forward for finders having a zoom ratio of about 2. However, the refracting powers of the respective groups increase as the zoom ratio increases, because the zooming actions of the lenses become intense. In particular, the refracting power(s) of the group(s) taking part in zooming becomes more intense. This in turn causes aberration variations to become large during zooming, and makes the amount of aberrations produced by the zooming group particularly large. Such two- or three-group zoom types make it difficult to correct aberrations produced by the group having an increased refracting power, because the number of groups involved is limited. These problems may be almost nearly resolved by use of a four-group arrangement wherein zooming action and the effect on correction for aberrations are well distributed to the respective groups. That the first group of this four-group zoom type is made up of a negative lens is particularly beneficial for an arrangement with the objective lens system having part of an image inverter, because the back focus of the objective can be increased.

Indeed, four-group zoom type finders having a zoom ratio of at least about 2 where the objective consists of four groups, negative, positive, negative and positive, are disclosed in JP-A-3-4217, JP-A-4-179908, JP-A-6-109974, JP-A6-118303, etc.

Among these, the arrangement set forth in JP-A-3-4217 has a relatively high zoom ratio of 2.75 but is of considerable size due to an increased number of lenses forming the objective. The arrangements set forth in JP-A-4-179908, 6-109974 and 6-118303, on the other hand, achieve compactness because of a reduced number of lenses but are less than satisfactory in terms of their zoom ratio.

SUMMARY OF THE INVENTION

An object of the present invention, accomplished with such problems associated with prior art in mind, is to provide a real image type of zoom finder which, albeit having a zoom ratio as high as at least 3, is short in terms of the total length of an objective and well corrected in terms of aberrations, and ensures satisfactory viewing as well.

According to the present invention, the above-mentioned object is achieved by the provision of a real image type of zoom finder comprising, in order from the object side, an objective having a positive refracting power, an optical system for inverting the upper, lower, left and right parts of an image formed by said objective, and an eyepiece having a positive refracting power, characterized in that said objective consists essentially of a first lens group having a negative refracting power, a second lens group having a positive refracting power, a third lens group having a negative refracting power and a fourth lens group having a positive refracting power, separations between said respective lens groups being varied for zooming, and conforms to the following conditional inequality (1):

$$1.35 < |f_1/f_2| \times m_T < 2.4 \quad (1)$$

where:
$f_1$ is the focal length of the first lens group,
$f_2$ is the focal length of the second lens group, and
$m_T$ is the magnification of the finder at the telephoto end.

Preferably, each of the lens groups forming the objective consists essentially of up to two lenses.

Preferably, at least one of the first or second lens group forming part of the objective has at least one aspheric surface.

Preferably, the objective conforms to the following conditional inequality (2):

$$0.2 < f_2/f_T < 0.64 \quad (2)$$

Here $f_2$ is the focal length of the second lens group, and $f_T$ is the focal length of the objective at the telephoto end.

Preferably, the second and third lens groups forming part of the objective is movable on the optical axis for zooming.

Preferably, the objective also conforms to the following conditional inequality (3):

$$0 < |f_3/f_T| < 1 \quad (3)$$

Here $f_3$ is the focal length of the third lens group.

Each of the respective lens groups forming the objective consists essentially of one lens.

In the objective, the first lens group consists essentially of one single lens while the second lens group consists essentially of two lenses.

Alternatively, at least three lens groups of the four lens groups forming the objective are designed to be movable along the optical axis for zooming.

According to another aspect of the present invention, there is provided a real image type of zoom finder comprising, in order from the object side, an objective having a positive refracting power, an optical system for inverting the upper, lower, left and right parts of an image formed by said objective, and an eyepiece having a positive refracting power, characterized in that said objective consists essentially of a first lens group having a negative refracting power, a second lens group having a positive refracting power, a third lens group having a negative refracting power and a fourth lens group having a positive refracting power, each of said respective lens group consisting of one lens and separations between said respective lens groups being varied for zooming.

According to still another aspect of the present invention, there is provided a real image type of zoom finder comprising, in order from the object side, an objective having a positive refracting power, an optical system for inverting the upper, lower, left and right parts of an image formed by said objective, and an eyepiece having a positive refracting power, characterized in that said objective consists essentially of a first lens group consisting of a single lens having a negative refracting power, a second lens group consisting of two lenses and having a positive refracting power as a whole, a third lens group having a negative refracting power and a fourth lens group having a positive refracting power, separations between said respective lens groups being varied for zooming.

According to a further aspect of the present invention, there is provided a real image type of zoom finder comprising, in order from the object side, an objective having a positive refracting power, an optical system for inverting the upper, lower, left and right parts of an image formed by said objective, and an eyepiece having a positive refracting power, characterized in that said objective consists essentially of a first lens group having a negative refracting power, a second lens group having a positive refracting power, a third lens group having a negative refracting power and a fourth lens group having a positive refracting power, at least three lens groups of said four lens groups are movable during zooming.

An account will now be given of why the above-mentioned arrangements are used and how they act.

For a real image type finder having a high zoom ratio such as one according to the present invention, it is desired that the objective consist essentially of four lens groups, say, negative, positive, negative and positive lens groups, as already stated.

In general, as the zoom ratio of a certain finder increases, it is required to increase the refracting powers of groups taking part in zooming, resulting in an increase in the amount of aberrations produced there. When such a finder having a high zoom ratio is constructed from two or three lens groups, aberrations produced by a group or groups taking part in zooming cannot be perfectly corrected by another group or groups. However, if the zoom system is constructed from four groups as is the case with the present invention, it is then possible to achieve a finder which is well corrected in terms of aberrations and reduced or limited in terms of aberration variations during zooming, and ensures satisfactory viewing over the entire zooming zone as well, because aberrations can be sufficiently corrected by groups other than those taking part in zooming.

Each lens group is of relatively simple design consisting of one or two lenses, so that the total length of the objective can be shorted.

With a real image type finder having a high zoom ratio, however, the higher the zoom ratio, the more difficult it is to correct coma at the telephoto end.

For this reason, it is preferable that an aspheric surface is used for at least one surface of the first or second lens group of the objective.

This design enables spherical aberration and coma to be reduced or substantially eliminated. Since the separation between the first and second lens groups at the telephoto end is so narrow that the same effect is achievable whichever surface of the first or second lens group is in aspheric form. This design is particularly effective for correction of coma at the telephoto end.

When the angle of field becomes wide at the wide-angle end and the total length of the objective becomes short, the refracting power of the first lens group becomes strong, thus making aberrations worse. However, use of the aspheric surface, especially use of the aspheric surface for the first lens of the first lens group makes it possible to correct off-axis rays at the wide-angle end. By making good use of the aspheric surface in this way, it is possible to obtain a finder of good performance, for instance, even when the first lens group is made up of one lens having a strong refracting power.

By conforming to inequality (1) as in the case of the present invention, it is also possible to maintain an adequate balance between refracting power and correction of aberrations; so it is possible to achieve a finder which is well corrected in terms of aberrations while the refracting power of the first lens group is reduced to some extent, and has a wide angle of field and a high zoom ratio with the total length of the objective remaining short.

$$1.35 < |f_1/f_2| \times m_T < 2.4 \tag{1}$$

where:

$f_1$ is the focal length of the first lens group,
$f_2$ is the focal length of the second lens group, and
$m_T$ is the magnification of the finder at the telephoto end.

When the lower limit of 1.35 in inequality (1) is not reached, on the one hand, the refracting power of the first lens group becomes too strong to correct a large amount of aberrations produced thereat by other surfaces. When the upper limit of 2.4 in inequality (1) is exceeded, on the other hand, it is impossible to reduce the total length of the objective while a wide angle of field is maintained at the wide-angle end.

In the objective according to the present invention, it is mainly the second lens group that takes part in zooming and it is the third lens group that has a share in diopter compensation. As the zoom ratio increases, the refracting power of the second lens group becomes stronger, and so makes the amount of aberrations produced larger. It is then desired to conform to inequality (2).

$$0.2 < f_2/f_T < 0.64 \tag{2}$$

Here $f_2$ is the focal length of the second lens group, and $f_T$ is the focal length of the objective at the telephoto end.

When the upper limit of 0.64 in inequality (2) is exceeded, on the one hand, the refracting power of the second lens group becomes too weak to achieve a finder having a desired high zoom ratio. When the lower limit of 0.2 is not reached, on the other hand, the second lens group becomes too strong in refracting power, and so produces excessive aberrations. Especially for the reason that rays are strongly bent around the lens, there are considerable increases in the amounts of coma produced around the image surface at the wide-angle end and higher-order spherical aberrations produced at the telephoto end.

To keep aberrations in good condition while some refracting power remains maintained, the second lens group may consist of at least two lenses so that the refracting power is distributed thereto. By constructing the second lens group from two or more lenses, it is easy to achieve a finder having a high zoom ratio, because the amount of aberrations produced can be reduced by diminishing the refracting power of each lens, and the second lens group is allowed to have a strong refracting power as a whole.

Inequality (3) gives a definition of the refracting power of the third lens group.

$$0 < |f_3/f_T| < 1 \tag{3}$$

Here $f_3$ is the focal length of the third lens group.

Inequality (3) is significant for correction of distortion and astigmatism. Exceeding the upper limit of 1 in inequality (3) is not preferable because the distortion remains undercorrected and overcorrected at the wide-angle and telephoto ends, respectively. With the upper limit of 1 in inequality (3) exceeded, the astigmatism remains undercorrected, and so curvature of field remains too large for correction.

According to the present invention, each lens group of the objective may or may not contain an image-inverting prism or the like for inverting the upper, lower, left and right parts of an image. Such prism-containing design, which means that air separations in prism-free design have been replaced by prisms, enables the length of the optical path to be increased by those prisms. One exemplary design wherein the fourth lens group and a prism are constructed as an integral piece is beneficial for the incorporation of plural reflecting surfaces because the back focus of the objective can be increased.

Prism-free design, on the other hand, enables the lens groups to be all movable and, hence, makes zooming and diopter compensation easy. This is particularly true of an objective having a high zoom ratio. By constructing the fourth lens group from a single lens, it is also possible to achieve a finder of better performance, because this design allows the lens to be more in the number of refracting surfaces than the prism-incorporated design by one, so that there can be an increase in the degree of freedom for correction of aberrations. By placing a prism having no lens action in the rear of the fourth lens group, it is further possible to make the back focus much longer. This design is advantageous for performance, although it is more in the number of parts than the design wherein the fourth lens group and a prism are constructed as an integral piece.

According to the objective of the present invention, at least two of the four lens groups are moved for zooming and diopter compensation while the separations between the first and second lens groups, the second and third lens groups, and the third and fourth lens groups are varied.

According to the present invention, three of the four lens groups forming the objective may be movable instead of conforming to the above-mentioned inequality (1). In this case, aberration variations taking place during zooming are more satisfactorily absorbed as compared with the case where two lens groups are moved, so that higher zoom ratios can be easily obtained. For zooming, each lens group of the objective may be constructed from one lens to vary the separations between the respective lens groups. Alternatively, the first lens group may be made up of a single lens while the second lens group may be made up of two lenses. In these cases, too, it is of course desired that the above-mentioned inequality (1) be satisfied.

Still other objects and advantages of the present invention will in part be obvious and will in part be apparent from the specification.

The present invention accordingly comprises the features of construction, combinations of elements, and arrangement of parts which will be exemplified in the construction hereinafter set forth, and the scope of the present invention will be indicated in the claims.

BRIEF DESCRIPTION OF THE DRAWINGS

FIGS. 8(a), 8(b) and 8(c) are aberration diagrams for spherical aberration, astigmatism, and distortion, respectively, at the wide angle end for Example 1. Similarly, FIGS. 9(a), 9(b) and 9(c) are aberration diagrams for Example 1 at an intermediate position, and FIGS. 10(a), 10(b) and 10(c) are aberration diagrams for Example 1 at the telephoto end. Since other examples have similar aberration diagrams, only the aberration diagrams for Example 1 are shown.

FIG. 8(a) shows spherical aberration, FIG. 8(b) shows astigmatism, and FIG. 8(c) shows distortion corresponding to Example 1 at the wide angle end.

FIG. 9(a) shows spherical aberration, FIG. 9(b) shows astigmatism, and FIG. 9(c) shows distortion corresponding to Example 1 at an intermediate position.

FIG. 10(a) shows spherical aberration, FIG. 10(b) shows astigmatism, and FIG. 10(c) shows distortion corresponding to Example 1 at the telephoto end.

DESCRIPTION OF THE PREFERRED EMBODIMENTS

The real image type of zoom finder according to the present invention will now be explained more specifically with reference to Examples 1 through 6.

Figure 1A:
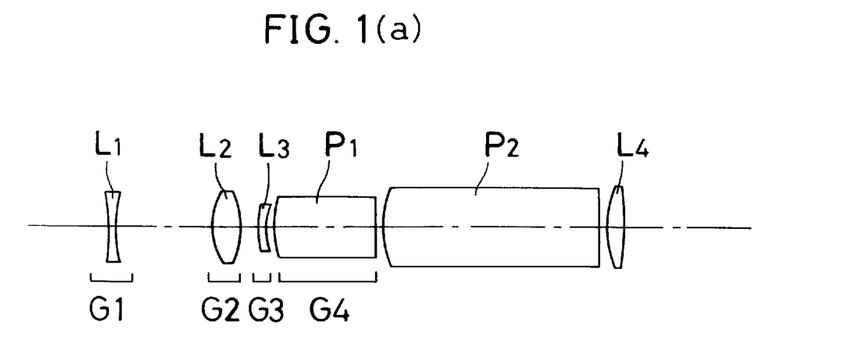
FIGS. 1(a)–1(c) are sectional views of Example 1 of the real image type of zoom finder according to the present invention at the wide-angle end FIG. 1(a), an intermediate setting FIG. 1(b), and the telephoto end FIG. 1(c).
Figure 1B:
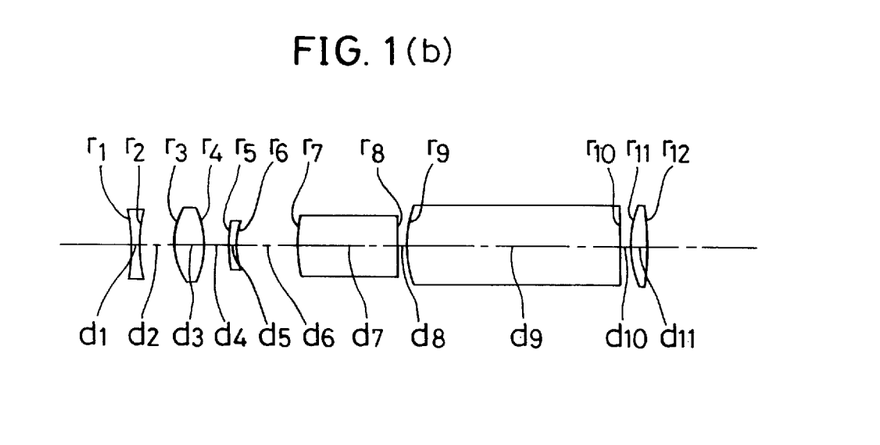
Figure 1C:
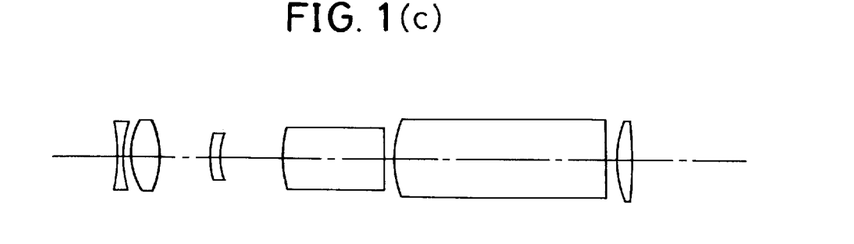

Numerical data on each example will be enumerated later. FIGS. 1(a)–1(c) show in section Example 1 of the present invention at the wide-angle end FIG. 1(a), an intermediate setting FIG. 1(b), and the telephoto end FIG. 1(c). The objective consists of a first negative lens group $G_1$, a second positive lens group $G_2$, a third negative lens group $G_3$ and a fourth positive lens group $G_4$, each consisting of one lens. More specifically, the first lens group $G_1$ consists of a double-concave lens $L_1$, the second lens group $G_2$ a double-convex lens $L_2$, the third lens group $G_3$ a negative meniscus lens $L_3$ convex on the object side, and the fourth lens group $G_4$ a lens made integral with a prism $P_1$ with the surface of incidence $r_7$ having a lens action. An image by the objective is formed in the vicinity of the surface of incidence of a second prism $P_2$, with the surface of incidence $r_9$ of $P_2$ acting as a field lens. For zooming, the second and third lens groups $G_2$ and $G_3$ are moved while the first and fourth lens groups $G_1$ and $G_4$ remain fixed. An eyepiece is denoted by $L_4$. Five aspheric surfaces in all are used for the object-side surfaces of $L_1$, $L_2$, $L_3$ and $P_1$, and the image-side surface of $L_4$.

Figure 2A:
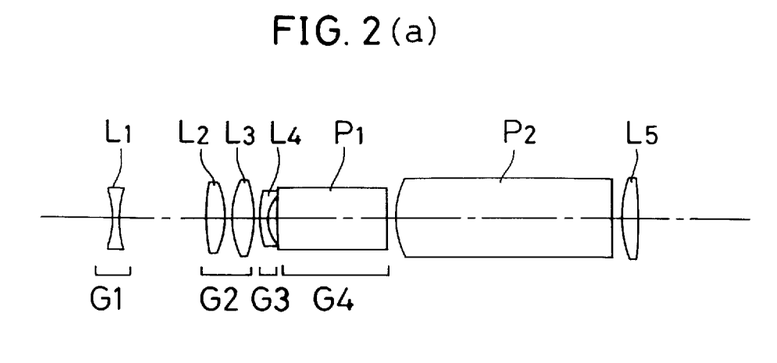
FIGS. 2(a)–2(c) are sectional views of Example 2 similar to FIGS. 1(a)–1(c).
Figure 2B:
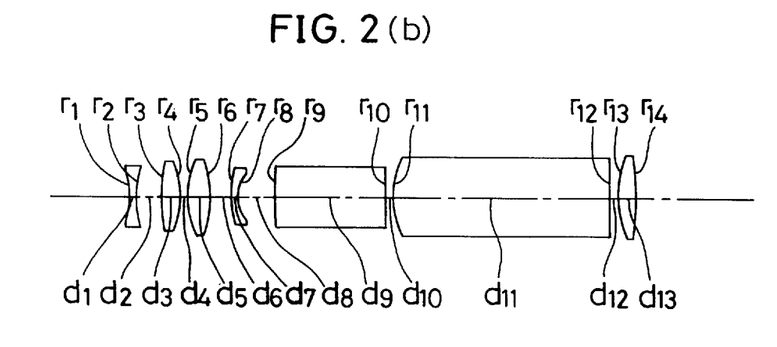
Figure 2C:
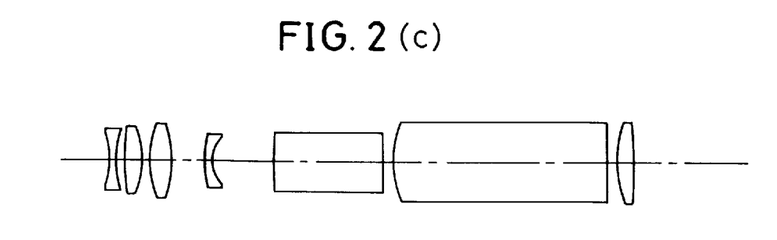

FIGS. 2(a)–2(c) are sectional views of Example 2 similar to FIGS. 1(a)–1(c). The objective consists of a first negative lens group $G_1$, a second positive lens group $G_2$, a third negative lens group $G_3$ and a fourth positive lens group $G_4$; the first, third and fourth lens groups $G_1$, $G_3$ and $G_4$ each consisting of one lens and the second lens group $G_2$ two lenses. More specifically, the first lens group $G_1$ consists of a double-concave lens $L_1$, the second lens group $G_2$ two double-convex lenses $L_2$ and $L_3$, the third lens group $G_3$ a negative meniscus lens $L_4$ convex on the object side, and the fourth lens group $G_4$ a lens made integral with a prism $P_1$, with the surface of incidence $r_9$ having a lens action. An image by the objective is formed in the vicinity of the surface of incidence $r_{11}$ of a second prism $P_2$ acting as a field lens. For zooming, the first, second and third lens groups $G_1$, $G_2$ and $G_3$ are moved while the fourth lens group $G_4$ remains fixed. An eyepiece is denoted by $L_5$. Five aspheric surfaces in all are used for the object-side surfaces of $L_1$, $L_2$, $L_4$ and $P_1$, and the image-side surface of $L_5$.

Figure 3A:
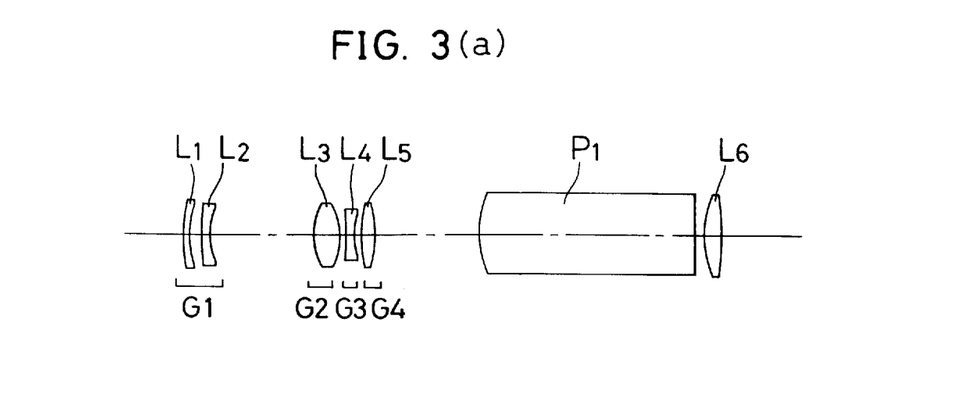
FIGS. 3(a)–3(c) are sectional views of Example 3 similar to FIGS. 1(a)–1(c).
Figure 3B:
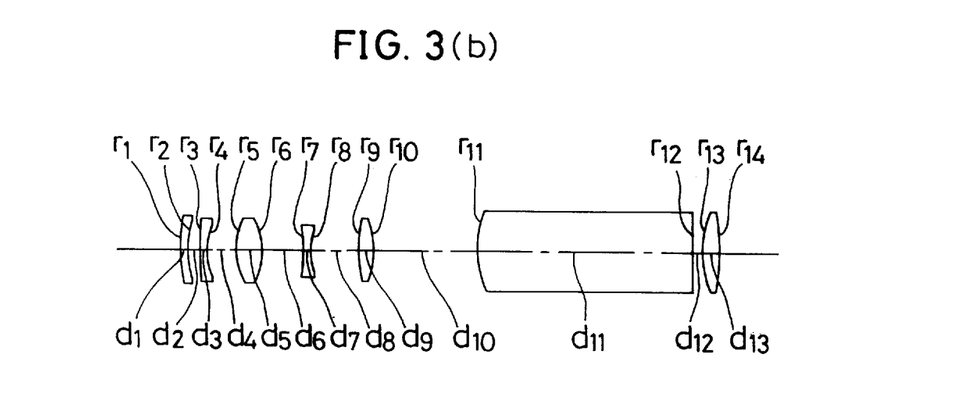
Figure 3C:
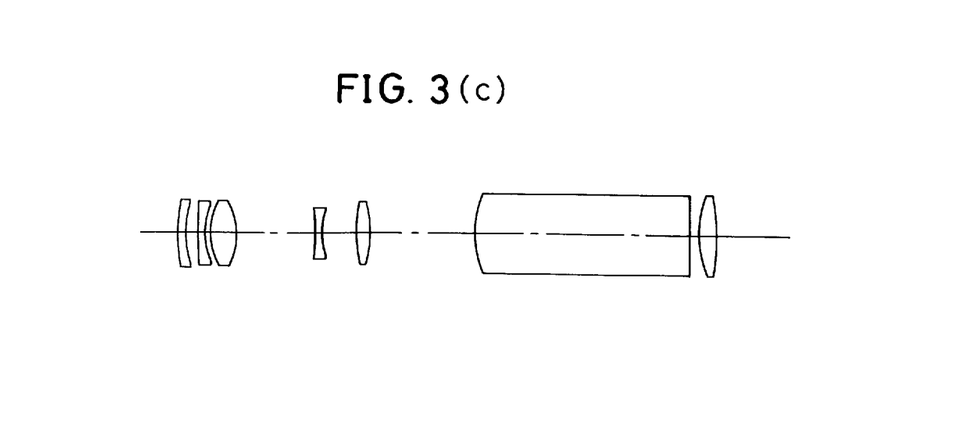

FIGS. 3(a)–3(c) are sectional views of Example 3 similar to FIGS. 1(a)–1(c). The objective consists of a first negative lens group $G_1$, a second positive lens group $G_2$, a third negative lens group $G_3$ and a fourth positive lens group $G_4$; the first lens group $G_1$ consisting of two lenses, and the second, third and fourth lens groups $G_2$, $G_3$ and $G_4$ each consisting of one lens. More specifically, the first lens group $G_1$ consists of two negative meniscus lenses $L_1$ and $L_2$ convex on the object side, the second lens group $G_2$ a double-convex lens $L_3$, the third lens group $G_3$ a double-concave lens $L_4$, and the fourth lens group $G_4$ a double-convex lens $L_5$. An image by the objective is formed in the vicinity of the surface of incidence of a first prism $P_1$, with the surface of incidence $r_{11}$ of $P_1$ acting as a field lens. For zooming, the second and third lens groups $G_2$ and $G_3$ are moved while the first and fourth lens group $G_1$ and $G_4$ remains fixed. An eyepiece is denoted by $L_6$. Five aspheric surfaces in all are used for the image-side surfaces of $L_1$, $L_2$ and $L_6$, and the object-side surfaces of $L_3$ and $L_4$.

Figure 4A:
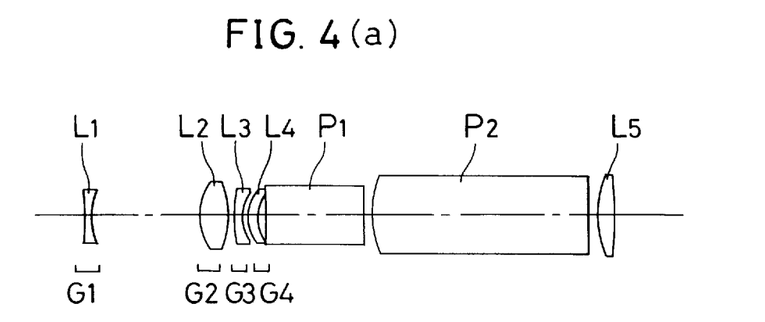
FIGS. 4(a)–4(c) are sectional views of Example 4 similar to FIGS. 1(a)–1(c).
Figure 4B:
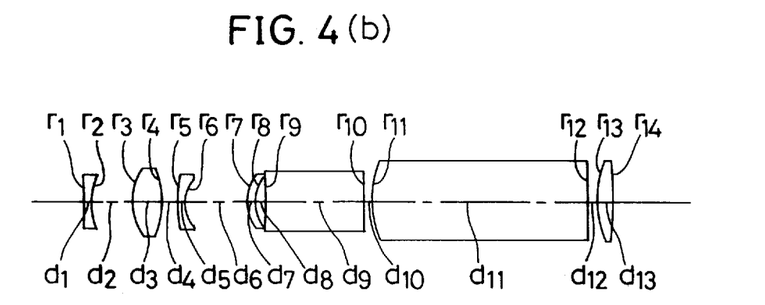
Figure 4C:
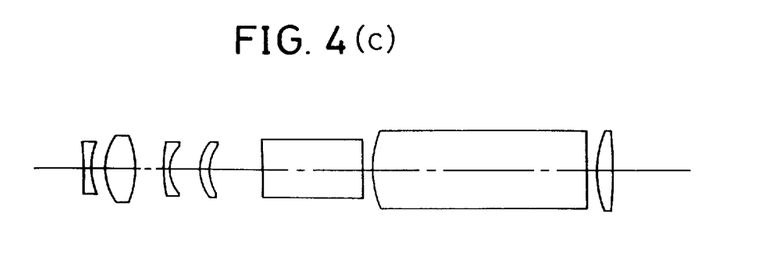

FIGS. 4(a)–4(c) are sectional views of Example 4 similar to FIGS. 1(a)–1(c). The objective consists of a first negative lens group $G_1$, a second positive lens group $G_2$, a third negative lens group $G_3$ and a fourth positive lens group $G_4$, each consisting of one lens. More specifically, the first lens group $G_1$ consists of a double-concave lens $L_1$, the second lens group $G_2$ a double-convex lens $L_2$, the third lens group $G_3$ a negative meniscus lens $L_3$ convex on the object side, and the forth lens group $G_4$ a positive meniscus lens $L_4$ convex on the object side. In the rear of the fourth lens group $G_4$ there is located a prism $P$, for image inversion, which has no lens action. An image by the objective is formed in the vicinity of the surface of incidence of a second prism $P_2$, with the surface of incidence $r_{11}$ of $P_2$ acting as a field lens. For zooming, the second, third and fourth lens groups $G_2$, $G_3$ and $G_4$ are moved while the first lens group $G_1$ remains fixed. An eyepiece is denoted by $L_5$. Five aspheric surfaces in all are used for the object-side surfaces of $L_1$, $L_2$, $L_3$ and $L_4$, and the image-side surface of $L_5$.

Figure 5A:
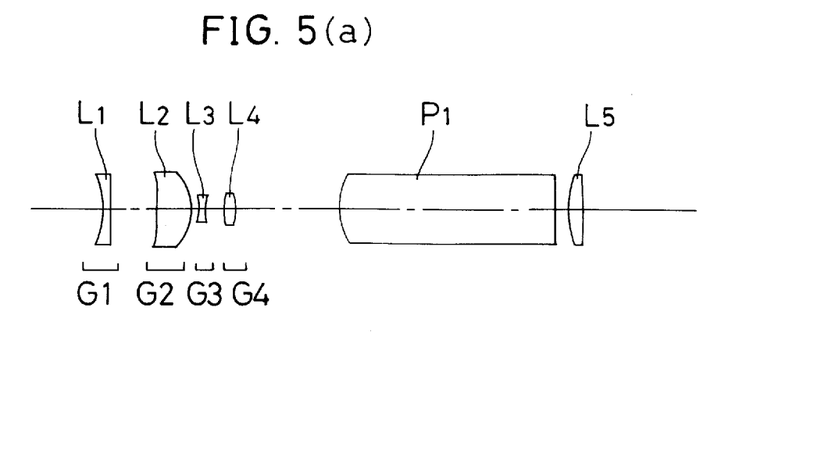
FIGS. 5(a)–5(c) are sectional views of Example 5 similar to FIGS. 1(a)–1(c).
Figure 5B:
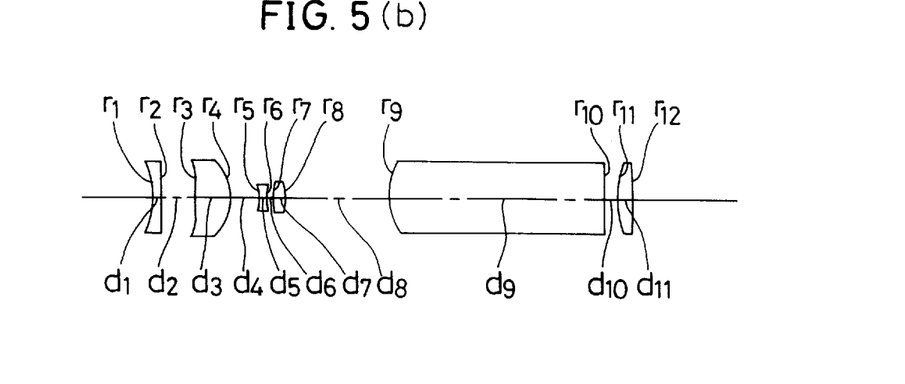
Figure 5C:
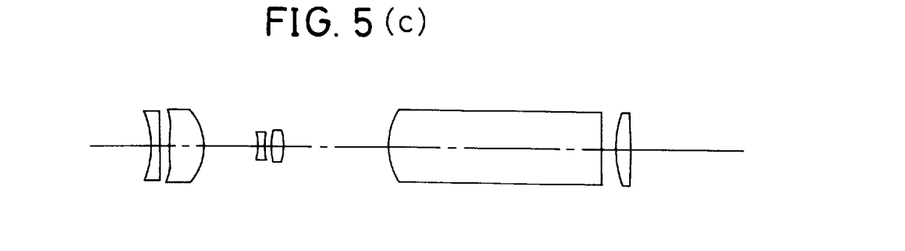

FIGS. 5(a)–5(c) are sectional views of Example 5 similar to FIGS. 1(a)–1(c). The objective consists of a first negative lens group $G_1$, a second positive lens group $G_2$, a third negative lens group $G_3$ and a fourth positive lens group $G_4$, each consisting of one lens. More specifically, the first lens group $G_1$ consists of a negative meniscus lens $L_1$ concave on the object side, the second lens group $G_2$ a double-convex lens $L_2$, the third lens group $G_3$ a double-concave lens $L_3$, and the forth lens group $G_4$ a double-convex lens $L_4$. An image by the objective is formed in the vicinity of the surface of incidence of a first prism $P_1$, with the surface of incidence $r_9$ of $P_1$ acting as a field lens. For zooming, the second and third lens groups $G_2$ and $G_3$ are moved while the first and fourth lens group $G_1$ and $G_4$ remain fixed. An eyepiece is denoted by $L_5$. Five aspheric surfaces in all are used for the object-side surfaces of $L_1$, $L_2$ and $L_3$, and the image-side surface of $L_4$ and $L_5$.

Figure 6A:
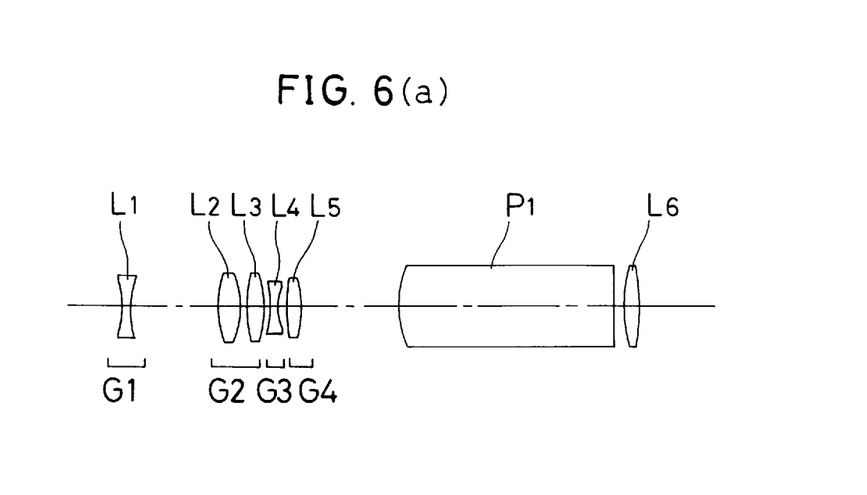
FIGS. 6(a)–6(c) are sectional views of Example 6 similar to FIGS. 1(a)–1(c).
Figure 6B:
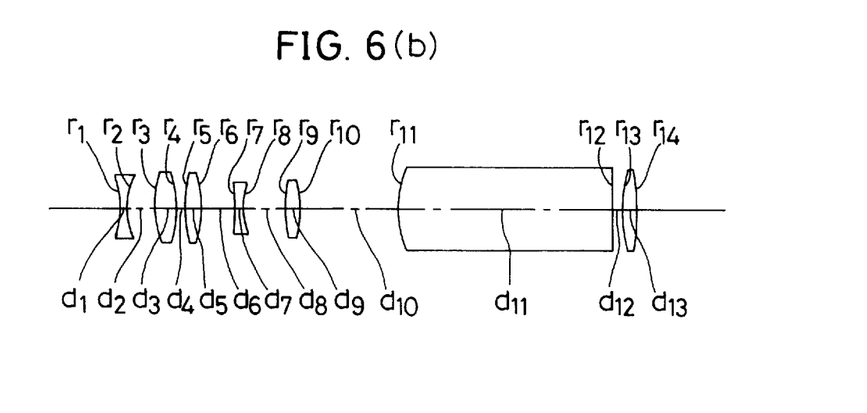
Figure 6C:
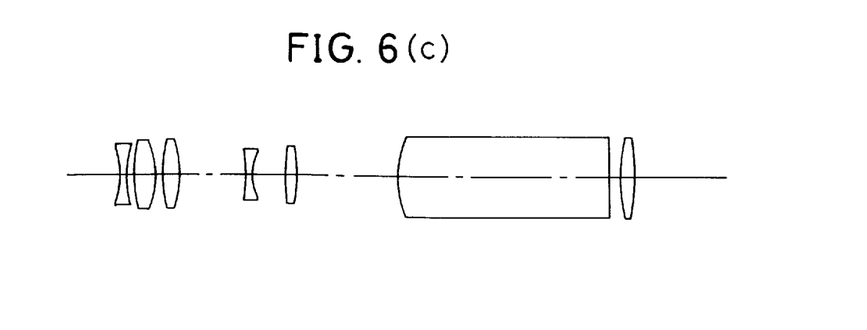

FIGS. 6(a)–6(c) are sectional views of Example 6 similar to FIGS. 1(a)–1(c). The objective consists of a first negative lens group $G_1$, a second positive lens group $G_2$, a third negative lens group $G_3$ and a fourth positive lens group $G_4$; the first, third and fourth lens groups $G_1$, $G_3$ and $G_4$ each consisting of one lens and the second lens group $G_2$ two lenses. More specifically, the first lens group $G_1$ consists of a double-concave lens $L_1$, the second lens group $G_2$ two double-convex lenses $L_2$ and $L_3$, the third lens group $G_3$ a double-concave lens $L_4$, and the fourth lens group $G_4$ a double-convex lens $L_5$. An image by the objective is formed in the vicinity of the surface of incidence of a first prism $P_1$, with the surface of incidence $r_{11}$ of $P_1$ acting as a field lens. For zooming, the second and third lens groups $G_2$ and $G_3$ are moved while the first and fourth lens groups $G_1$ and $G_4$ remain fixed. An eyepiece is denoted by $L_6$. Five aspheric surfaces in all are used for the object-side surfaces of $L_1$ and $L_2$, and the image-side surfaces of $L_3$, $L_4$ and L6.

Enumerated below are numerical data on Examples 1 through 6. Symbols used hereinafter but not hereinbefore have the following meanings.

$\omega$ is the half angle of field of emergence (°),

E.P. is the eye point (mm), m is the magnification of the finder, $r_1$, $r_2$, are the radii of curvature of the respective lens surfaces (mm), $d_1$, $d_2$, are the separations between the respective lens surfaces (mm), $n_{d1}$, $n_{d2}$, are the d-line refractive indices of the respective lenses, and $\nu_{d1}$, $\nu_{d2}$, are the Abbe's number of the respective lenses.

Here let x and y represent the direction of propagation of light on the optical axis and the direction perpendicular the optical axis, respectively. Then, aspheric shape is given by $$x=(y^2/r)/[1+\{1-P(y/r)^2\}^{1/2}]+A_4 y^4+A_6 y^6+A_8 y^8+A_{10} y^{10}$$

where r is the paraxial radius of curvature, P is the conical coefficient, and $A_4$, $A_6$, $A_8$ and $A_{10}$ are the 4th, 6th, 8th and 10th aspherical coefficients.

EXAMPLE 1

$\omega = 26 \sim 17.3 \sim 8.7°$, E.P. = 18.5, m = 0.4~1.2

| | | |
|---|---|---|
| $r_1 = -22.041$ (Aspheric) | $d_1 = 1$ | $n_{d1} = 1.58423$ $\nu_{d1} = 30.49$ |
| $r_2 = 16.124$ | $d_2 =$ (Variable) | |
| $r_3 = 8.28$ (Aspheric) | $d_3 = 3.86$ | $n_{d2} = 1.52542$ $\nu_{d2} = 55.78$ |
| $r_4 = -11.116$ | $d_4 =$ (Variable) | |
| $r_5 = 17.485$ (Aspheric) | $d_5 = 1$ | $n_{d3} = 1.58423$ $\nu_{d3} = 30.49$ |
| $r_6 = 7.104$ | $d_6 =$ (Variable) | |
| $r_7 = 14.85$ (Aspheric) | $d_7 = 14$ | $n_{d4} = 1.52542$ $\nu_{d4} = 55.78$ |
| $r_8 = \infty$ | $d_8 = 1$ | |
| $r_9 = 13.146$ | $d_9 = 29.5$ | $n_{d5} = 1.52542$ $\nu_{d5} = 55.78$ |
| $r_{10} = \infty$ | $d_{10} = 1.25$ | |
| $r_{11} = 14.857$ | $d_{11} = 2.2$ | $n_{d6} = 1.52542$ $\nu_{d6} = 55.78$ |
| $r_{12} = -42.24$ (Aspheric) | | |

Zooming Spaces

| $\omega$ | 26° | 17.3° | 8.7° |
|---|---|---|---|
| $d_2$ | 13.24 | 4.85 | 0.8 |
| $d_4$ | 2.26 | 3.47 | 7.17 |
| $d_6$ | 1.15 | 8.33 | 8.69 |

Aspherical Coefficients
 1st surface
 P=1
 $A_4 = 0.24707 \times 10^{-3}$
 $A_6 = -0.27623 \times 10^{-4}$
 $A_8 = 0.18475 \times 10^{-5}$
 $A_{10} = -0.52885 \times 10^{-7}$
 3rd surface
 P=1
 $A_4 = -0.66779 \times 10^{-3}$
 $A_6 = 0.12628 \times 10^{-4}$
 $A_8 = -0.10052 \times 10^{-5}$
 $A_{10} = 0.27947 \times 10^{-7}$
 5th surface
 P=1

$A_4=-0.14709\times10^{-3}$
$A_6=-0.27763\times10^{-5}$
$A_8=-0.38184\times10^{-6}$
$A_{10}=0$
7th surface
P=1
$A_4=-0.26235\times10^{-3}$
$A_6=0.49323\times10^{-4}$
$A_8=-0.20084\times10^{-5}$
$A_{10}=0$
12th surface
P=1
$A_4=0.63147\times10^{-4}$
$A_6=0.74991\times10^{-7}$
$A_8=0.12626\times10^{-7}$
$A_{10}=-0.20455\times10^{-9}$

EXAMPLE 2

| $\omega = 25.1\sim16.1\sim7.2°$, E.P. = 18.5, m = 0.4~1.4 ||||
|---|---|---|---|
| $r_1 = -10.388$ (Aspheric) | $d_1 = 1$ | $n_{d1} = 1.58423$ | $\nu_{d1} = 30.49$ |
| $r_2 = 14.199$ | $d_2 =$ (Variable) | | |
| $r_3 = 15.467$ (Aspheric) | $d_3 = 2.75$ | $n_{d2} = 1.52542$ | $\nu_{d2} = 55.78$ |
| $r_4 = -11.766$ | $d_4 = 0.79$ | | |
| $r_5 = 10.828$ | $d_5 = 3.15$ | $n_{d3} = 1.58423$ | $\nu_{d3} = 30.49$ |
| $r_6 = -16.052$ | $d_6 =$ (Variable) | | |
| $r_7 = 17.748$ (Aspheric) | $d_7 = 1$ | $n_{d4} = 1.52542$ | $\nu_{d4} = 55.78$ |
| $r_8 = 4.52$ | $d_8 =$ (Variable) | | |
| $r_9 = 80.406$ (Aspheric) | $d_9 = 15.29$ | $n_{d5} = 1.52542$ | $\nu_{d5} = 55.78$ |
| $r_{10} = \infty$ | $d_{10} = 1$ | | |
| $r_{11} = 13.146$ | $d_{11} = 29.5$ | $n_{d6} = 1.52542$ | $\nu_{d6} = 55.78$ |
| $r_{12} = \infty$ | $d_{12} = 1.25$ | | |
| $r_{13} = 14.857$ | $d_{13} = 2.2$ | $n_{d7} = 1.52542$ | $\nu_{d7} = 55.78$ |
| $r_{14} = -42.24$ (Aspheric) | | | |

Zooming Spaces

| $\omega$ | 25.1° | 16.1° | 7.2° |
|---|---|---|---|
| $d_2$ | 11.87 | 3.35 | 0.8 |
| $d_6$ | 0.79 | 2.87 | 4.65 |
| $d_8$ | 1.15 | 4.99 | 8.37 |

Aspherical Coefficients
1st surface
P=1
$A_4=0.58479\times10^{-3}$
$A_6=-0.40529\times10^{-4}$
$A_8=0.36668\times10^{-5}$
$A_{10}=-0.1191\times10^{-6}$
3rd surface
P=1
$A_4=-0.74546\times10^{-3}$
$A_6=0.18434\times10^{-4}$
$A_8=-0.10038\times10^{-5}$
$A_{10}=0.21474\times10^{-7}$
7th surface
P=1
$A_4=0.79196\times10^{-4}$
$A_6=0.5395\times10^{-5}$
$A_8=-0.60921\times10^{-6}$
$A_{10}=0.26508\times10^{-7}$
9th surface
P=1
$A_4=-0.13704\times10^{-3}$
$A_6=0.11275\times10^{-3}$
$A_8=-0.10214\times10^{-4}$
$A_{10}=0.35211\times10^{-6}$
14th surface
P=1
$A_4=0.63147\times10^{-4}$
$A_6=0.74991\times10^{-7}$
$A_8=0.12626\times10^{-7}$
$A_{10}=-0.20455\times10^{-9}$

EXAMPLE 3

| $\omega = 26\sim17.3\sim7.4°$, E.P. = 18.5, m = 0.4~1.4 ||||
|---|---|---|---|
| $r_1 = 31.136$ | $d_1 = 1$ | $n_{d1} = 1.58423$ | $\nu_{d1} = 30.49$ |
| $r_2 = 20.519$ (Aspheric) | $d_2 = 1.51$ | | |
| $r_3 = 52.297$ | $d_3 = 1$ | $n_{d2} = 1.58423$ | $\nu_{d2} = 30.49$ |
| $r_4 = 6.928$ (Aspheric) | $d_4 =$ (Variable) | | |
| $r_5 = 7.312$ (Aspheric) | $d_5 = 3.64$ | $n_{d3} = 1.52542$ | $\nu_{d3} = 55.78$ |
| $r_6 = -9.723$ | $d_6 =$ (Variable) | | |
| $r_7 = -37.525$ (Aspheric) | $d_7 = 0.99$ | $n_{d4} = 1.58423$ | $\nu_{d4} = 30.49$ |
| $r_8 = 7.156$ | $d_8 =$ (Variable) | | |
| $r_9 = 16.678$ | $d_9 = 1.96$ | $n_{d5} = 1.52542$ | $\nu_{d5} = 55.78$ |
| $r_{10} = -15.735$ | $d_{10} = 14$ | | |
| $r_{11} = 13.146$ | $d_{11} = 29.5$ | $n_{d6} = 1.52542$ | $\nu_{d6} = 55.78$ |
| $r_{12} = \infty$ | $d_{12} = 1.25$ | | |
| $r_{13} = 14.857$ | $d_{13} = 2.2$ | $n_{d7} = 1.52542$ | $\nu_{d7} = 55.78$ |
| $r_{14} = -42.24$ (Aspheric) | | | |

Zooming Spaces

| $\omega$ | 26° | 17.3° | 7.4° |
|---|---|---|---|
| $d_4$ | 14.08 | 3.89 | 0.79 |
| $d_6$ | 0.79 | 5.49 | 10.48 |
| $d_8$ | 1 | 6.48 | 4.6 |

Aspherical Coefficients
2nd surface
P=1
$A_4=0.36313\times10^{-3}$
$A_6=0.11097\times10^{-4}$
$A_8=0.23735\times10^{-6}$
$A_{10}=0$
4th surface
P=1
$A_4=-0.93547\times10^{-3}$
$A_6=-0.20921\times10^{-4}$
$A_8=0.32443\times10^{-7}$
$A_{10}=0$
5th surface
P=1
$A_4=-0.83901\times10^{-3}$
$A_6=-0.59683\times10^{-5}$
$A_8=-0.14057\times10^{-6}$
$A_{10}=0.20676\times10^{-8}$
7th surface
P=1
$A_4=0.29147\times10^{-5}$
$A_6=0.36996\times10^{-5}$
$A_8=-0.69614\times10^{-6}$
$A_{10}=0$
14th surface
P=1
$A_4=0.63147\times10^{-4}$
$A_6=0.74991\times10^{-7}$
$A_8=0.12626\times10^{-7}$
$A_{10}=-0.20455\times10^{-9}$

EXAMPLE 4

$\omega = 26\sim17.3\sim7.4°$, E.P. = 18.5, m = 0.4~1.4

| | | | |
|---|---|---|---|
| $r_1 = -36.226$ (Aspheric) | $d_1 = 1$ | $n_{d1} = 1.58423$ | $\nu_{d1} = 30.49$ |
| $r_2 = 9.374$ | $d_2 = $ (Variable) | | |
| $r_3 = 5.936$ (Aspheric) | $d_3 = 4.15$ | $n_{d2} = 1.52542$ | $\nu_{d2} = 55.78$ |
| $r_4 = -10.801$ | $d_4 = $ (Variable) | | |
| $r_5 = 17.529$ (Aspheric) | $d_5 = 1$ | $n_{d3} = 1.58423$ | $\nu_{d3} = 30.49$ |
| $r_6 = 5.196$ | $d_6 = $ (Variable) | | |
| $r_7 = 5.914$ (Aspheric) | $d_7 = 1.23$ | $n_{d4} = 1.52542$ | $\nu_{d4} = 55.78$ |
| $r_8 = 6.907$ | $d_8 = $ (Variable) | | |
| $r_9 = \infty$ | $d_9 = 13.5$ | $n_{d5} = 1.52542$ | $\nu_{d5} = 55.78$ |
| $r_{10} = \infty$ | $d_{10} = 1$ | | |
| $r_{11} = 13.146$ | $d_{11} = 29.5$ | $n_{d6} = 1.52542$ | $\nu_{d6} = 55.78$ |
| $r_{12} = \infty$ | $d_{12} = 1.25$ | | |
| $r_{13} = 14.857$ | $d_{13} = 2.2$ | $n_{d7} = 1.52542$ | $\nu_{d7} = 55.78$ |
| $r_{14} = -42.24$ (Aspheric) | | | |

Zooming Spaces

| $\omega$ | 26° | 17.3° | 7.4° |
|---|---|---|---|
| $d_2$ | 14.55 | 5.5 | 1.8 |
| $d_4$ | 0.8 | 2.17 | 4.03 |
| $d_6$ | 0.74 | 8.42 | 4.09 |
| $d_8$ | 1.03 | 1.03 | 7.21 |

Aspherical Coefficients
1st surface
P=1
$A_4 = -0.76816 \times 10^{-5}$
$A_6 = -0.1938 \times 10^{-4}$
$A_8 = 0.25926 \times 10^{-5}$
$A_{10} = -0.10536 \times 10^{-6}$
3rd surface
P=1
$A_4 = -0.74945 \times 10^{-3}$
$A_6 = -0.98716 \times 10^{-5}$
$A_8 = -0.59624 \times 10^{-6}$
$A_{10} = 0.72904 \times 10^{-8}$
5th surface
P=1
$A_4 = -0.93827 \times 10^{-3}$
$A_6 = -0.28038 \times 10^{-5}$
$A_8 = 0.13164 \times 10^{-5}$
$A_{10} = 0$
7th surface
P=1
$A_4 = 0.30441 \times 10^{-3}$
$A_6 = -0.21674 \times 10^{-4}$
$A_8 = 0.184 \times 10^{-6}$
$A_{10} = 0$
14th surface
P=1
$A_4 = 0.63147 \times 10^{-4}$
$A_6 = 0.74991 \times 10^{-7}$
$A_8 = 0.12626 \times 10^{-7}$
$A_{10} = -0.20455 \times 10^{-9}$

EXAMPLE 5

$\omega = 27.4\sim20.4\sim13.3°$, E.P. = 16.5, m = 0.37~0.76

| | | | |
|---|---|---|---|
| $r_1 = -7.874$ (Aspheric) | $d_1 = 1$ | $n_{d1} = 1.58423$ | $\nu_{d1} = 30.49$ |
| $r_2 = -185.034$ | $d_2 = $ (Variable) | | |
| $r_3 = 15.217$ (Aspheric) | $d_3 = 5.04$ | $n_{d2} = 1.49241$ | $\nu_{d2} = 57.66$ |
| $r_4 = -6.5257$ | $d_4 = $ (Variable) | | |
| $r_5 = -5.618$ (Aspheric) | $d_5 = 1$ | $n_{d3} = 1.49241$ | $\nu_{d3} = 57.66$ |
| $r_6 = 8.275$ | $d_6 = $ (Variable) | | |
| $r_7 = 6.758$ | $d_7 = 1.93$ | $n_{d4} = 1.49241$ | $\nu_{d4} = 57.66$ |
| $r_8 = -7.23$ (Aspheric) | $d_8 = 14$ | | |
| $r_9 = 9.044$ | $d_9 = 29.5$ | $n_{d5} = 1.52542$ | $\nu_{d5} = 55.78$ |
| $r_{10} = \infty$ | $d_{10} = 1.5$ | | |
| $r_{11} = 12.2$ | $d_{11} = 2.1$ | $n_{d6} = 1.49241$ | $\nu_{d6} = 57.66$ |
| $r_{12} = -69.944$ (Aspheric) | | | |

Zooming Spaces

| $\omega$ | 27.4° | 20.4° | 13.3° |
|---|---|---|---|
| $d_2$ | 6.11 | 4.58 | 1.33 |
| $d_4$ | 0.77 | 3.96 | 7.16 |
| $d_6$ | 2.37 | 0.7 | 0.76 |

Aspherical Coefficients
1st surface
P=1
$A_4 = 0.11241 \times 10^{-2}$
$A_6 = -0.28423 \times 10^{-4}$
$A_8 = 0.14734 \times 10^{-5}$
$A_{10} = -0.34773 \times 10^{-7}$
3rd surface
P=1
$A_4 = -0.17877 \times 10^{-2}$
$A_6 = -0.25309 \times 10^{-5}$
$A_8 = -0.66392 \times 10^{-5}$
$A_{10} = 0$
5th surface
P=1
$A_4 = 0.18495 \times 10^{-2}$
$A_6 = -0.1832 \times 10^{-3}$
$A_8 = 0.87773 \times 10^{-4}$
$A_{10} = 0$
8th surface
P=1
$A_4 = 0.10147 \times 10^{-2}$
$A_6 = 0.29369 \times 10^{-3}$
$A_8 = -0.33838 \times 10^{-4}$
$A_{10} = 0$
12th surface
P=1
$A_4 = 0.12938 \times 10^{-3}$
$A_6 = -0.14813 \times 10^{-5}$
$A_8 = 0.41663 \times 10^{-7}$
$A_{10} = 0$

EXAMPLE 6

$\omega = 25.1\sim16.1\sim7.2°$, E.P. = 18.6, m = 0.4~1.4

| | | | |
|---|---|---|---|
| $r_1 = -9.063$ (Aspheric) | $d_1 = 1$ | $n_{d1} = 1.58423$ | $\nu_{d1} = 30.49$ |
| $r_2 = 12.526$ | $d_2 = $ (Variable) | | |
| $r_3 = 10.216$ (Aspheric) | $d_3 = 3.2$ | $n_{d2} = 1.52542$ | $\nu_{d2} = 55.78$ |
| $r_4 = -11.986$ | $d_4 = 0.8$ | | |
| $r_5 = 21.096$ | $d_5 = 2.31$ | $n_{d3} = 1.52542$ | $\nu_{d3} = 55.78$ |
| $r_6 = -15.568$ (Aspheric) | $d_6 = $ (Variable) | | |
| $r_7 = -19.001$ | $d_7 = 1$ | $n_{d4} = 1.58423$ | $\nu_{d4} = 30.49$ |
| $r_8 = 6.416$ (Aspheric) | $d_8 = $ (Variable) | | |
| $r_9 = 21.74$ | $d_9 = 1.89$ | $n_{d5} = 1.52542$ | $\nu_{d5} = 55.78$ |
| $r_{10} = 16.491$ | $d_{10} = 13.5$ | | |
| $r_{11} = 14.004$ | $d_{11} = 29.5$ | $n_{d6} = 1.52542$ | $\nu_{d6} = 55.78$ |
| $r_{12} = \infty$ | $d_{12} = 1.1$ | | |

-continued

| ω = 25.1~16.1~7.2°, E.P. = 18.6, m = 0.4~1.4 | | | |
|---|---|---|---|
| $r_{13}$ = 19.488 | $d_{13}$ = 2.1 | $n_{d7}$ = 1.52542 | $v_{d7}$ = 55.78 |
| $r_{14}$ = −24.966 (Aspheric) | | | |

Zooming Spaces

| ω | 25.1° | 16.1° | 7.2° |
|---|---|---|---|
| $d_2$ | 12.06 | 3.62 | 0.8 |
| $d_6$ | 0.79 | 4.7 | 9.21 |
| $d_8$ | 1.37 | 5.9 | 4.22 |

Aspherical Coefficients
1st surface
P=3.8427
$A_4$=0.10679×10$^{-2}$
$A_6$=−0.47304×10$^{-6}$
$A_8$=0.74103×10$^{-6}$
$A_{10}$=0.50363×10$^{-7}$
3rd surface
P=0.6951
$A_4$=−0.73111×10$^{-3}$
$A_6$=0.24091×10$^{-4}$
$A_8$=−0.15714×10$^{-5}$
$A_{10}$=0.33787×10$^{-7}$
6th surface
P=2.1661
$A_4$=0.12261×10$^{-3}$
$A_6$=−0.17182×10$^{-5}$
$A_8$=−0.32823×10$^{-6}$
$A_{10}$=0.90569×10$^{-8}$
8th surface
P=0.1756
$A_4$=−0.81369×10$^{-4}$
$A_6$=0.6473×10$^{-4}$
$A_8$=−0.13979×10$^{-4}$
$A_{10}$=0.88415×10$^{-6}$
14th surface
P=1.7564
$A_4$=0.35714×10$^{-4}$
$A_6$=0.19063×10$^{-5}$
$A_8$=−0.67149×10$^{-7}$
$A_{10}$=0.93791×10$^{-9}$ Tabulated below are the values corresponding to the above-mentioned inequalities (1) to (3) in Examples 1 through 6

| Inequality | Ex.1 | Ex.2 | Ex.3 | Ex.4 | Ex.5 | Ex.6 |
|---|---|---|---|---|---|---|
| (1) | 1.95 | 1.97 | 1.98 | 2.22 | 1.07 | 1.65 |
| (2) | 0.38 | 0.24 | 0.29 | 0.27 | 0.63 | 0.26 |
| (3) | 0.84 | 0.36 | 0.35 | 0.44 | 0.41 | 0.28 | which have the following corresponding values

| Example No. | 1 | 2 | 3 | 4 | 5 | 6 |
|---|---|---|---|---|---|---|
| $m_T$ | 1.2 | 1.4 | 1.4 | 1.4 | 0.76 | 1.4 |
| $f_T$ | 25.2 | 29.4 | 29.4 | 29.4 | 15.96 | 29.4 |
| $f_1$ | 15.561 | 9.929 | 12.058 | 12.587 | 14.156 | 9.009 |
| $f_2$ | 9.576 | 7.056 | 8.526 | 7.938 | 10.055 | 7.644 |
| $f_3$ | 21.168 | 10.584 | 10.29 | 12.936 | 6.544 | 8.232 |

Figure 7A:
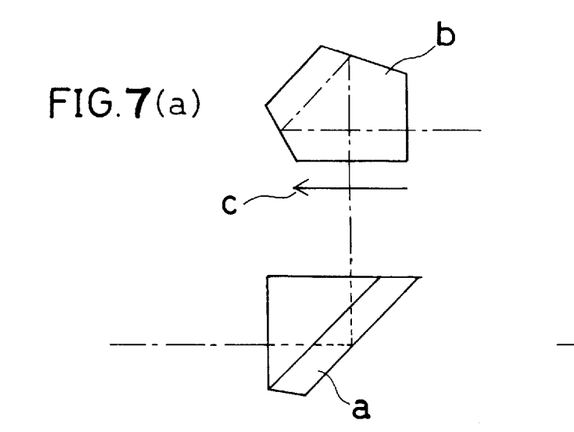
FIGS. 7(a)–7(d) show examples of the optical system for image inversion used in the respective examples.
Figure 7B:
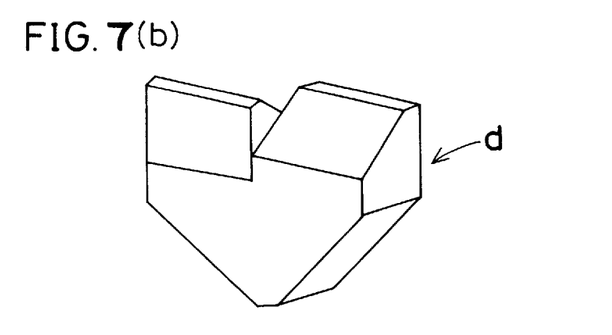
Figure 7C:
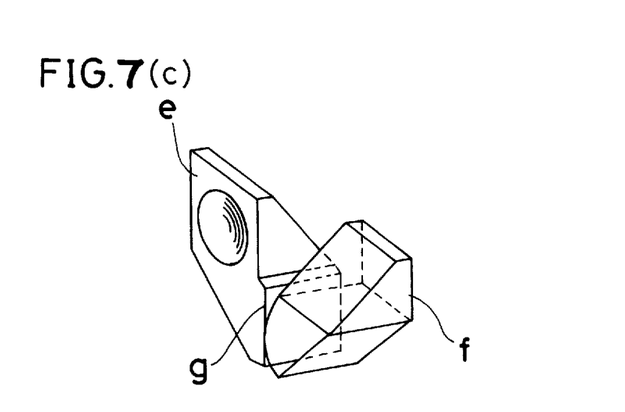
Figure 7D:
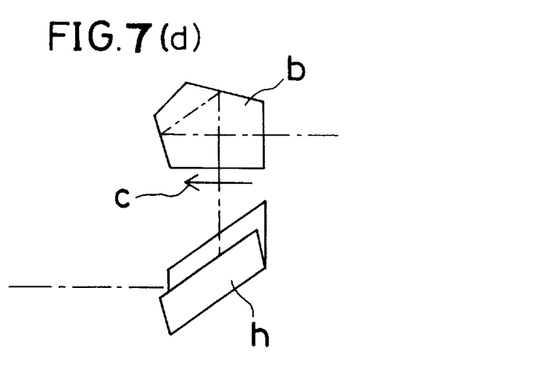
Figures 8A, 8B, 8C:
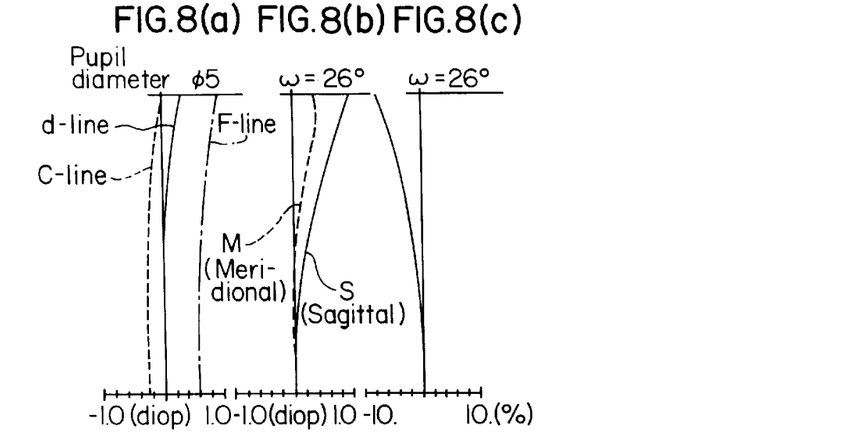
Figures 9A, 9B, 9C:
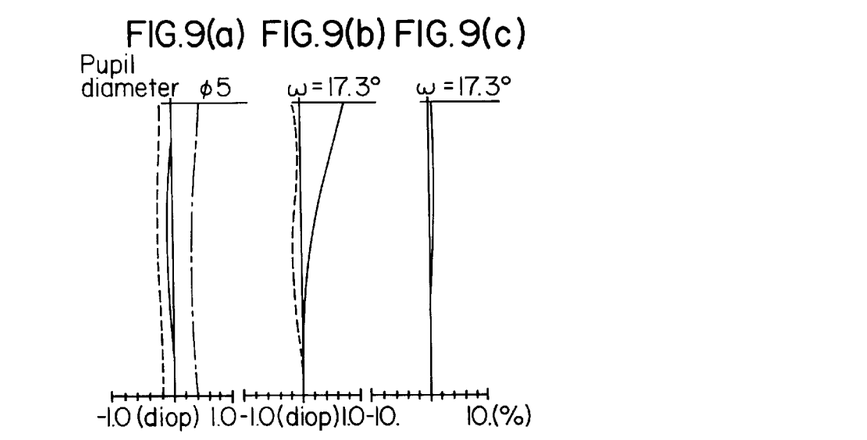
Figures 10A, 10B, 10C:
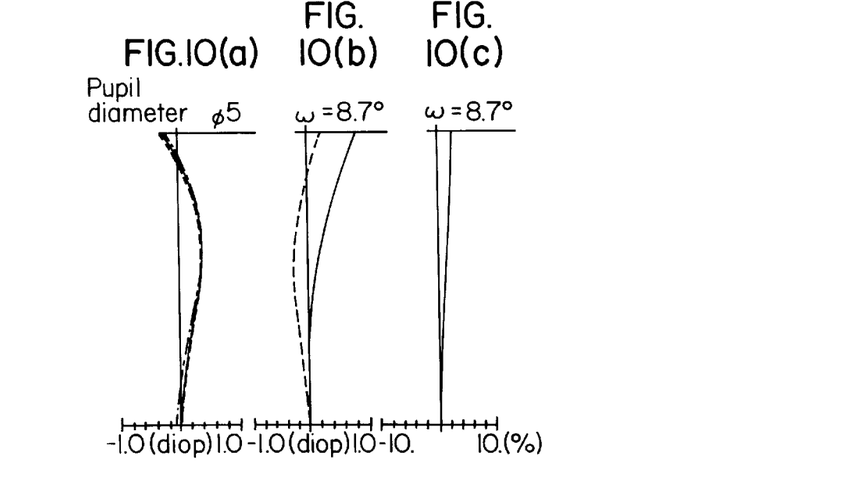

Any desired optical systems for image inversion may be used in Examples 1 through 6. For instance, a combined roof prism (a) and penta prism (b) as shown in FIG. 7(a) or a Porro prism consisting of two prisms (e) and (f) as shown in FIG. 7(c) may be used in Examples 1, 2 and 4. Such prisms (e) and (f) as shown in FIG. (c) may be constructed from mirrors. The optical systems for image inversion are characterized in that an image plane (c) is formed between the roof prism (a) and the penta prism (b) in the case shown in FIG. 7(a) and in that an image plane is formed on a viewing frame (g) located between the two prisms (e) and (f). Either a combined roof mirror (h) and penta prism (b) as shown in FIG. 7(d) or one Porro prism (d) as shown in FIG. 7(b) may be used in Examples 3, 5 and 6.

As can be seen from the foregoing explanations, the present invention successfully provides a real image type of zoom finder which is of relatively simple construction, has a high zoom ratio, is of small size, and is well improved in terms of aberration performance.

What we claim is:

1. A real image type of zoom finder comprising, in order from the object side, an objective having a positive refracting power, an optical system for inverting the upper, lower, left and right parts of an image formed by said objective, and an eyepiece having a positive refracting power, wherein said objective consists essentially of a first lens group having a negative refracting power, a second lens group having a positive refracting power, a third lens group having a negative refracting power and a fourth lens group having a positive refracting power, separations between said respective lens groups being varied for zooming, and conforms to the following conditional inequality (1):

$$1.35 < |f_1/f_2| \times m_T < 2.4 \qquad (1)$$

where:

$f_1$ is a focal length of the first lens group, $f_2$ is a focal length of the second lens group, and $m_T$ is a magnification of the finder at the telephoto end.

2. A real image type of zoom finder comprising, in order from the object side, an objective having a positive refracting power, an optical system for inverting the upper, lower, left and right parts of an image formed by said objective, and an eyepiece having a positive refracting power, wherein:

said objective consists essentially of a first lens group having a negative refracting power, a second lens group having a positive refracting power, a third lens group having a negative refracting power and a fourth lens group having a positive refracting power, each of said respective lens groups consisting of one lens and separations between said respective lens groups being varied for zooming.

3. A real image type of zoom finder comprising, in order from object side, an objective having a positive refracting power, an optical system for inverting upper, lower, left and right parts of an image formed by said objective, and an eyepiece having a positive refracting power, wherein:

said objective consists essentially of a first lens group consisting of a single lens having a negative refracting power, a second lens group consisting of two lenses and having a positive refracting power as a whole, a third lens group having a negative refracting power and a fourth lens group having a positive refracting power, separations between said respective lens groups being varied for zooming.

4. The real image type of zoom finder according to claim 1, wherein each of the lens groups forming said objective consists essentially of up to two lenses.

5. The real image type of zoom finder according to claim 1, wherein the first lens group forming part of said objective has at least one aspheric surface.

6. The real image type of zoom finder according to claim 1, wherein the second lens group forming part of said objective has at least one aspheric surface.

7. The real image type of zoom finder according to claim 1, wherein said objective conforms to the following conditional inequality (2):

$$0.2 < f_2/f_T < 0.64 \qquad (2)$$

is focal length of the objective at the telephoto end.

8. The real image type of zoom lens according to claim 1, wherein the second and third lens groups forming part of said objective are movable on the optical axis for zooming.

9. The real image type of zoom lens according to claim 1, wherein said objective conforms to the following conditional inequality (3):

$$0 < |f_3/f_T| < 1 \qquad (3)$$

where $f_3$ is th focal length of the third lens group and $f_T$ is a focal length of the objective at the telephoto end.

10. The real image type of zoom finder according to claim 1, wherein each of the respective lens groups forming said objective consists essentially of one lens.

11. The real image type of zoom finder according to claim 1, wherein the first lens group forming part of said objective consists essentially of one single lens and said second lens group consists essentially of two lenses.

12. The real image type of zoom finder according to claim 1 or 2, wherein at least three lens groups of the four lens groups forming said objective are movable along the optical axis for zooming.

13. The real image type of zoom finder according to claim 1, wherein said first lens group consists essentially of two lenses, and said second, third and fourth lens groups each consists essentially of one lens.

14. The real image type of zoom finder according to claim 1, wherein the first lens group forming part of said objective consists essentially of one single lens and said second lens group consists essentially of two lenses.

15. The real image type of zoom finder according to claim 2 or 3, wherein the first lens group forming part of said objective has at least one aspheric surface.

16. The real image type of zoom finder according to claim 2 or 3, wherein the second lens group forming part of said objective has at least one aspheric surface.

17. The real image type of zoom finder according to claim 4 or 3, wherein said objective conforms to the following conditional inequality (2):

$$0.2 < f_2/f_T < 0.64 \qquad (2)$$

where $f_2$ is a focal length of the second lens group, and $f_T$ is a focal length of the objective at the telephoto end.

18. The real image type of zoom lens according to claim 2 or 3, wherein the second and third lens groups forming part of said objective are movable on the optical axis for zooming.

19. The real image type of zoom lens according to claim 4 or 3, wherein said objective conforms to the following conditional inequality (3):

$$0 < |f_3/f_T| < 1 \qquad (3)$$

where $f_3$ is a focal length of the third lens group and $f_T$ is a focal length of the objective at the telephoto end.

20. A real image type of zoom finder comprising, in order from the object side, an objective having a positive refracting power, an optical system for inverting upper, lower, left and right parts of an image formed by said objective, and an eyepiece having a positive refracting power, wherein:

said objective consists essentially of a first lens group having a negative refracting power, a second lens group having a positive refracting power, a third lens group having a negative refracting power and a fourth lens group having a positive refracting power, at least three lens groups of said four lens groups being movable during zooming, wherein said objective conforms to the following conditional inequality (2):

$$0.2 < f_2/f_T < 0.64 \qquad (2)$$

where $f_2$ is a focal length of the second lens group, and $f_T$ is a focal length of the objective at the telephoto end.

21. A real image type of zoom finder comprising, in order from the object side, an objective having a positive refracting power, an optical system for inverting upper, lower, left and right parts of an image formed by said objective, and an eyepiece having a positive refracting power, wherein:

said objective consists essentially of a first lens group having a negative refracting power, a second lens group having a positive refracting power, a third lens group having a negative refracting power and a fourth lens group having a positive refracting power, at least three lens groups of said four lens groups being movable during zooming, wherein said objective conforms to the following conditional inequality (3):

$$0 < |f_3/f_T| < 1 \qquad (3)$$

where $f_3$ is a focal length of the third lens group.

* * * * *

UNITED STATES PATENT AND TRADEMARK OFFICE
CERTIFICATE OF CORRECTION

PATENT NO. : 5,815,312

DATED : Sep. 29, 1998

INVENTOR(S) : TAKATO

It is certified that error appears in the above-identified patent and that said Letters Patent is hereby corrected as shown below:

On the title page;

Please change [73] Assignee: "Azusa Patent Office" to --Olympus Optical Co., Ltd.--

Signed and Sealed this

Twenty-fourth Day of August, 1999

Attest:

Q. TODD DICKINSON

*Attesting Officer*     *Acting Commissioner of Patents and Trademarks*